United States Patent [19]

Chan

[11] Patent Number: 5,596,922
[45] Date of Patent: Jan. 28, 1997

[54] APPARATUS FOR COOKING A FOOD PRODUCT

[75] Inventor: Cynthia W. Chan, Kowloon, Hong Kong

[73] Assignee: Ying Fat Electric Products Ltd., Hong Kong

[21] Appl. No.: 446,485

[22] Filed: May 22, 1995

[51] Int. Cl.$^6$ ............................. A47J 37/00; A21B 5/02
[52] U.S. Cl. .................. 99/380; 99/372; 99/427
[58] Field of Search ............................. 99/372, 380, 381, 99/382, 376, 377, 378, 426, 427, 430, 439, 428, 440, 441, 442; 249/160, 161, 162, 170

[56] References Cited

U.S. PATENT DOCUMENTS

| | | | |
|---|---|---|---|
| 267,535 | 11/1882 | Hurd | 99/380 |
| 1,875,482 | 9/1932 | Nanna | 99/372 |
| 2,009,791 | 7/1935 | Shroyer | 99/377 |
| 2,066,507 | 1/1937 | Yost | 99/376 |
| 2,720,157 | 10/1955 | Harrison | 99/380 |
| 3,707,906 | 1/1973 | Marrie | 99/372 |
| 4,091,720 | 5/1978 | Wheeler. | |
| 4,167,900 | 9/1979 | Eichler. | |
| 4,297,941 | 11/1981 | Gallina. | |

FOREIGN PATENT DOCUMENTS

| | | | |
|---|---|---|---|
| 0180592 | 2/1907 | Germany | 99/372 |
| 2201334 | 9/1988 | United Kingdom. | |
| 2224925 | 5/1990 | United Kingdom. | |
| WO93/03661A1 | 3/1993 | WIPO. | |

Primary Examiner—Timothy F. Simone
Assistant Examiner—Reginald L. Alexander
Attorney, Agent, or Firm—Burns, Doane, Swecker & Mathis

[57] ABSTRACT

Apparatus for cooking a food product, for example a hamburger, comprises a mould assembly for cooking the hamburger. The mould assembly is formed from first and second moulds (3,3') formed on upper and lower bodies (1,2). Each mould is formed with a pair of radially opposed arcuate side wall portions (5,6). The side wall portions (5, 6) on respective moulds (3,3') are so located and dimensioned that when they are brought together they define a substantially continuous side wall. When the moulds are moved apart spaces between the side wall portions allow the hamburger to be easily removed.

8 Claims, 6 Drawing Sheets

APPARATUS FOR COOKING A FOOD PRODUCT

FIELD OF THE INVENTION

This invention relates to an appliance for forming and cooking a food product, and in particular, though not exclusively, to a hamburger maker.

BACKGROUND OF THE INVENTION

Cooking appliances are known which comprise upper and lower bodies which are hinged together so as to be opened and closed. Each of the upper and lower bodies comprise complementary mould portions such that when the upper and lower bodies are brought together into the closed configuration a mould is formed in which a food product may be cooked. Normally both the upper and lower bodies are formed with electric heating elements to cook the food product.

Examples of such prior known cooking appliances are toasted sandwich makers, waffle makers, and the present applicant has previously proposed an electric pie maker. Such a cooking appliance has been proposed for hamburgers, but in contrast to other food products such as sandwiches hamburgers present particular problems.

In particular because of the constituency of hamburger meat it is important that the mould when formed should completely define the shape of the resultant hamburger. However if this is simply achieved by bringing together two half-mould portions each corresponding to one half of the hamburger, it can be difficult to remove the cooked hamburger from the mould afterwards. It may for example be necessary to insert a knife, spatula, or similar utensil between the edge of the mould and the hamburger, and this may cause the hamburger to break up, or worse may damage the surface of the mould—especially if the surface is provided with a non-stick coating.

SUMMARY OF THE INVENTION

It is an object of the present invention therefore to provide an appliance for forming and cooking a food product, eg a hamburger, in which the cooked food product may easily be removed from the mould without damaging either the food product or the mould.

According to the present invention therefore there is provided apparatus for cooking a food product comprising a mould assembly for receiving the food product and comprising co-operating first and second moulds, each of said first and second moulds comprising a partial side wall portion, said partial side wall portions of said first and second moulds being disposed complementarily to each other whereby when said first and second moulds are brought together to define said mould assembly said partial side wall portions define a substantially continuous side wall.

By means of this arrangement when the first and second moulds are brought together a mould assembly is formed that defines the shape of the food product, but when the cooking operation is completed and the moulds are moved apart to release the food product, because each mould is formed with only a partial side wall portion rather than a complete side wall, a space is left to facilitate removal of the food product.

In a particularly preferred embodiment the partial side wall portions are arcuate and the resulting continuous side wall is circular.

Preferably each mould is provided with two arcuate side wall portions disposed radially opposite each other, the side wall portions in one said mould being disposed at substantially 90° relative to the side wall portions formed in the other mould.

Preferably each mould portion is provided with an associated heating element for cooking of the food product in use.

In a particularly preferred embodiment the first and second moulds are provided respectively on upper and lower bodies, said upper and lower bodies being hingedly mounted to permit said first and second moulds to be brought together and moved apart as required. Preferably said heating elements are provided on said upper and lower bodies respectively. Preferably the upper and lower bodies are each provided with two moulds whereby when the two bodies are brought together two mould assemblies are defined so as to permit two food products to be cooked at the same time.

It is particularly preferred that the surface of at least one of the first and second moulds defined within the partial side wall portions, and which therefore define the upper and lower surfaces of the food product, be textured. Such texturing may, for example comprise a series of parallel ribs to provide extra heating surface whereby the food product may be heated more quickly, or alternatively the surface in question may be provided with a series of projections that project into the food product meat both to provide an attractive visual appearance and also, when the food product is meat or a meat product, to tenderise the meat.

Of course it will be understood that one surface may be textured and the other smooth, or both may be textured, either with the same form of texturing on both surfaces or different forms on respective surfaces.

It should be understood that the provision of projections on one of the surfaces may have applicability beyond the presently described apparatus for cooking a food product. For example, if the cooking appliance is used to cook a meat other than hamburger meat—for example a steak—the tenderising effect of the projections will be important.

Accordingly the invention also provides apparatus for cooking meat or a meat product comprising a mould assembly comprising co-operating first and second moulds, said first and second moulds each having a surface defining respectively the upper and lower surfaces of the mould assembly, one of said surfaces being provided with a plurality of projections adapted to project into meat or a meat product received within the mould assembly in use.

BRIEF DESCRIPTION OF THE DRAWINGS

Some embodiments of the invention will now be described by way of example and with reference to the accompanying drawings, in which.

DETAILED DESCRIPTION

Figure 1:
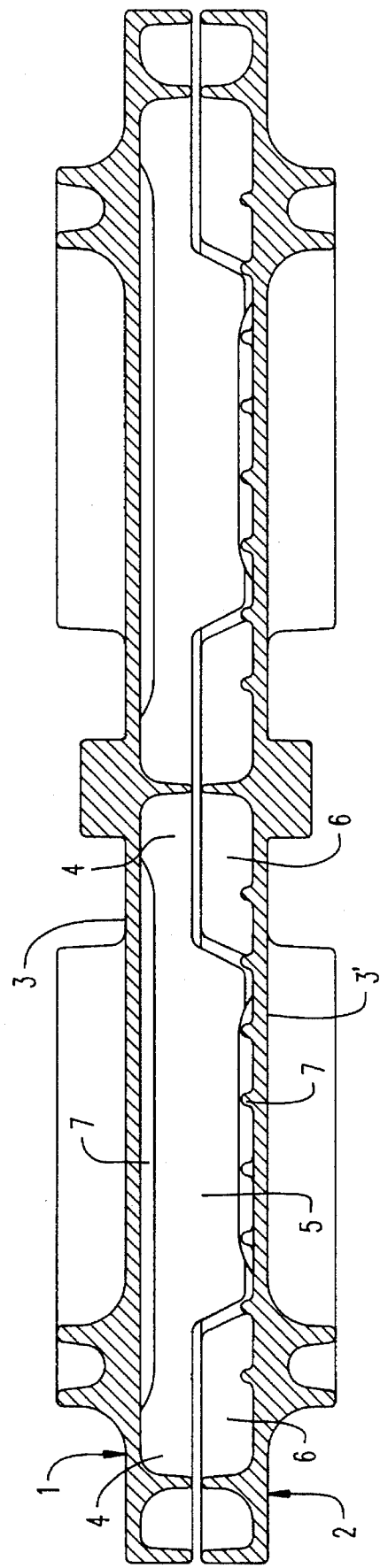
FIG. 1 is a front view in section of a first embodiment of the present invention.

Referring firstly to FIG. 1 there is shown the upper 1 and lower 2 body portions of a cooking appliance in the form of a burger maker. Omitted from FIG. 1 for clarity are the outer casings for both the upper and lower body portions, the heating elements and the accompanying circuitry, all of which are conventional.

Figure 2:
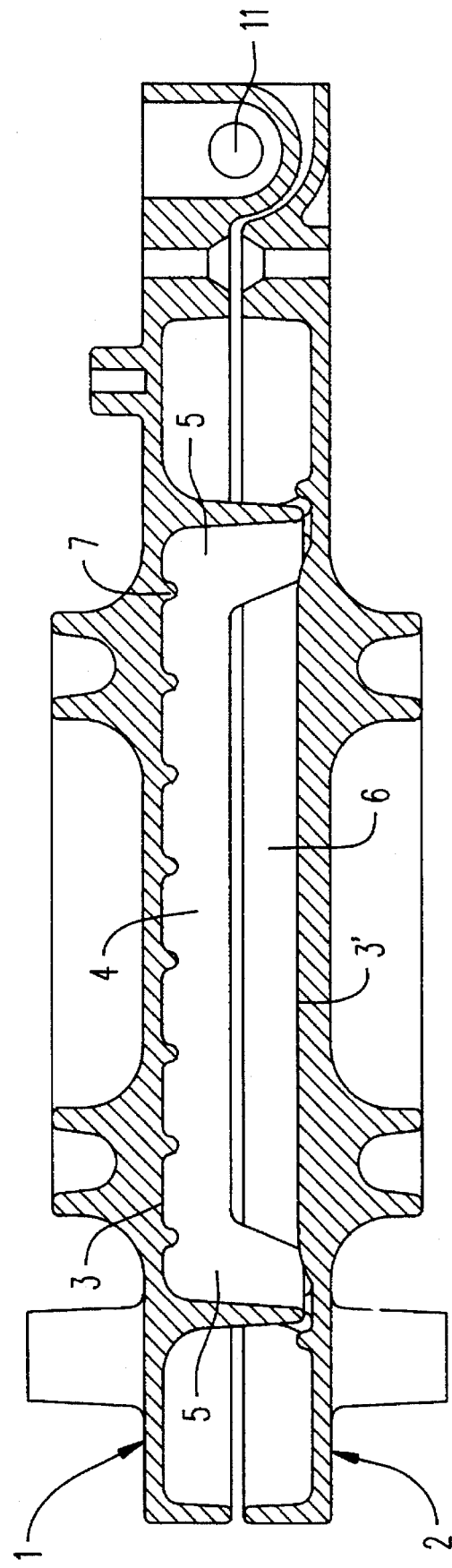
FIG. 2 is a side view in section of the embodiment of FIG. 1.

The upper 1 and lower 2 body portions are each formed with two substantially identical moulds 3,3'. The body portions are generally rectangular in shape and, as shown in FIG. 2, are hingedly connected along a rear edge whereby the body portions may be brought together or moved apart. When the body portions are brought together into the position shown in FIGS. 1 and 2 the moulds formed on the respective body portions come together to define a mould assembly in which a food product, in this case a hamburger, may be cooked. As such the structure so far described is conventional and in general terms is similar to well-known sandwich makers, waffle makers or the applicant's earlier pie maker.

The shape of the moulds 3,3' and the resulting mould assembly will now be described in more detail. Since the two moulds formed on each body portion are substantially identical, for convenience only one will be described. The mould 3 formed on the upper body portion 1 comprises an annular side wall portion 4 extending around the complete circumference of the mould 3. The height of this side wall portion 4 is substantially half the desired height of the complete mould assembly. At two radially opposed locations the side wall portion 4 is formed with a depending arcuate side wall portion 5 and in these regions the height of the side wall is substantially equal to the desired height of the complete mould.

Turning now to the mould 3' formed on the lower body portion 2 mould 3' comprises two radially opposed arcuate side wall portions 6, each side wall portion being half the height of the complete mould assembly. The side wall portions are radially opposed to each other and at 90° to the radially opposed arcuate side wall portions 5 formed on the mould of the upper body portion.

The length of the arcuate side wall portions 5 formed on the upper body mould is substantially equal to the space defined between the two arcuate side wall portions formed on the lower body mould, and in turn the length of the arcuate side wall portions 6 formed on the lower body mould are substantially equal to the spacing between the depending arcuate side wall portions 5 formed on the upper body mould. Thus the combined length of the two depending arcuate side wall portions 5 and the two arcuate side wall portions 6 is substantially equal to the complete circumference of the mould assembly. It will also be apparent that since the side wall portions on one of the moulds are shifted by 90° with respect to the side wall portions on the other mould, one side wall portion formed on one mould is located so as to correspond to the gap between the two corresponding side wall portions formed on the other mould. Thus, with this arrangement when the two body portions are brought together to close the appliance a complete mould assembly is defined with the depending side wall portions 5 being located between the arcuate side wall portions 6 formed on the lower body 2. It will also be noted from FIGS. 1 and 2 that the edges of the arcuate side wall portions 5, 6 are formed so as to slope in a complementary manner so as to assist in the location of depending arcuate side wall portions 5 between arcuate side wall portions 6. It is not, however, necessary that the two arcuate side wall portions formed on either of the two moulds be of the same size as each other. As is shown for example in FIG. 3 one of the depending arcuate side wall portions 5' may be shorter than the other depending arcuate side wall portion 5".

With this arrangement it will be appreciated that when the two body portions are brought together the moulds 3,3' come together to define a circular substantially continuous mould assembly in which a hamburger or similar food product may be cooked. When the cooking operation is completed the mould assembly is opened by pivoting the upper body 1 away from the lower body about the hinge H. With the upper body removed the hamburger can easily be removed from the lower body mould 3' because of the gaps between the two arcuate side wall portions 6. These gaps facilitate access to the hamburger, for example by allowing a utensil to be slid easily between the hamburger and the lower surface of the mould so as to remove the cooked hamburger.

Of course although the arcuate side wall portions come together to define a substantially continuous side wall, the resulting side wall will not be completely continuous and there may be narrow gaps in the side wall at the junctions between the side wall portions. These gaps may in fact be beneficial since they will permit excess fat or oil or moisture to be discharged from the mould during cooking, or alternatively if there is an excess of oil outside of the mould, such oil may flow back into the mould.

Figure 3:
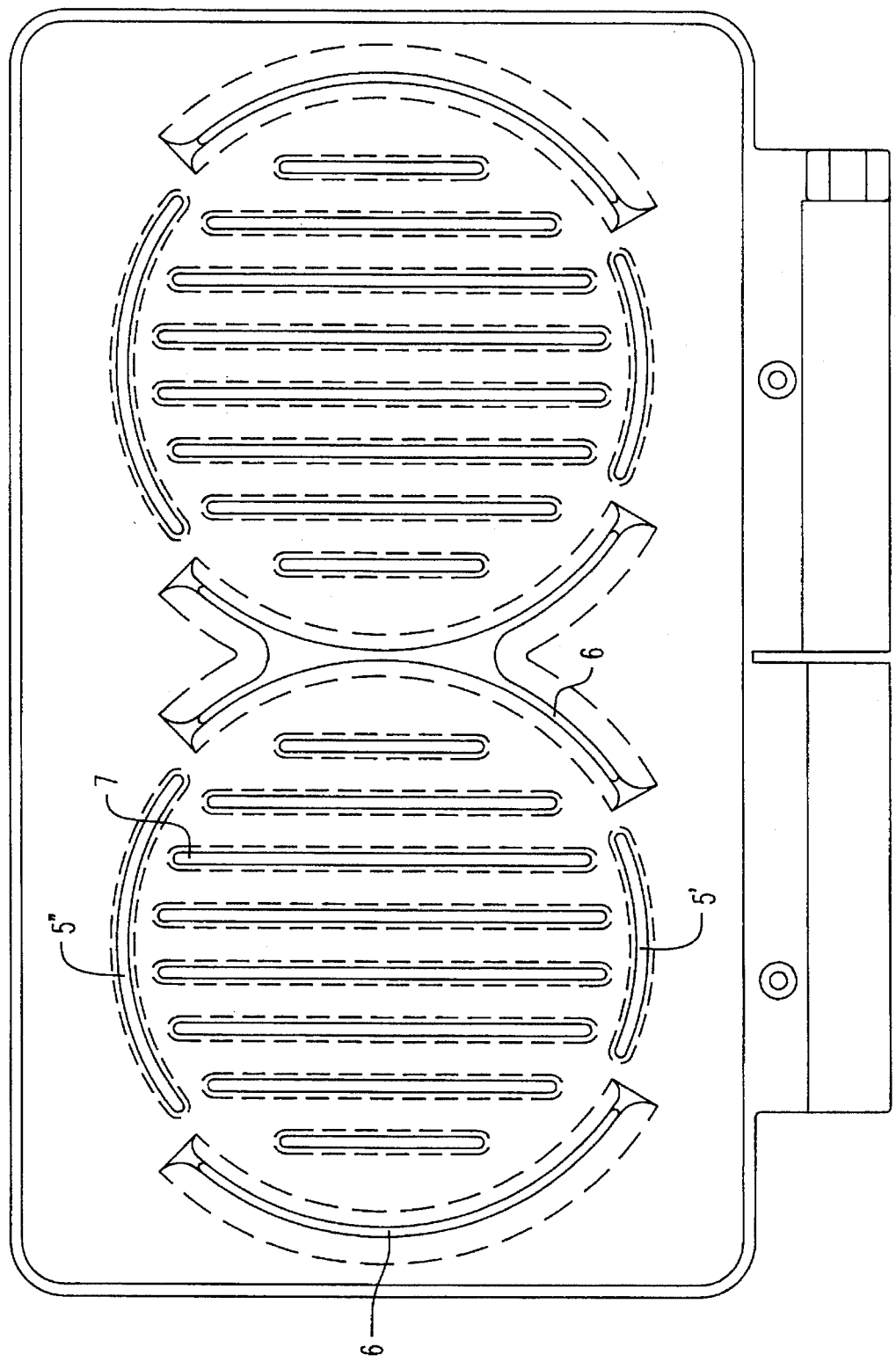
FIG. 3 is a plan view of the cooking surface of a lower body portion in the embodiment of FIG. 1.

As is shown in FIGS. 1 to 3, the surfaces of the upper and lower moulds 3,3', which therefore define the upper and lower surfaces of the resultant hamburger, may be provided with a series of parallel ribs 7. In the embodiment of FIGS. 1 to 3 the ribs 7 on the upper mould 3 are perpendicular to the corresponding ribs 7 on the lower mould surface. These ribs serve a dual purpose. Firstly when the hamburger meat is pressed in the mould assembly between the upper and lower moulds, they define a larger cooking surface than would be the case if the surface of the mould were flat. This larger surface allows the hamburger meat to be heated and sealed more quickly. Secondly the ribs 7 also provide the finished hamburger with a pleasing textured appearance. Such ribs 7 may be provided on one or both of the mould surfaces as desired.

Figure 4:
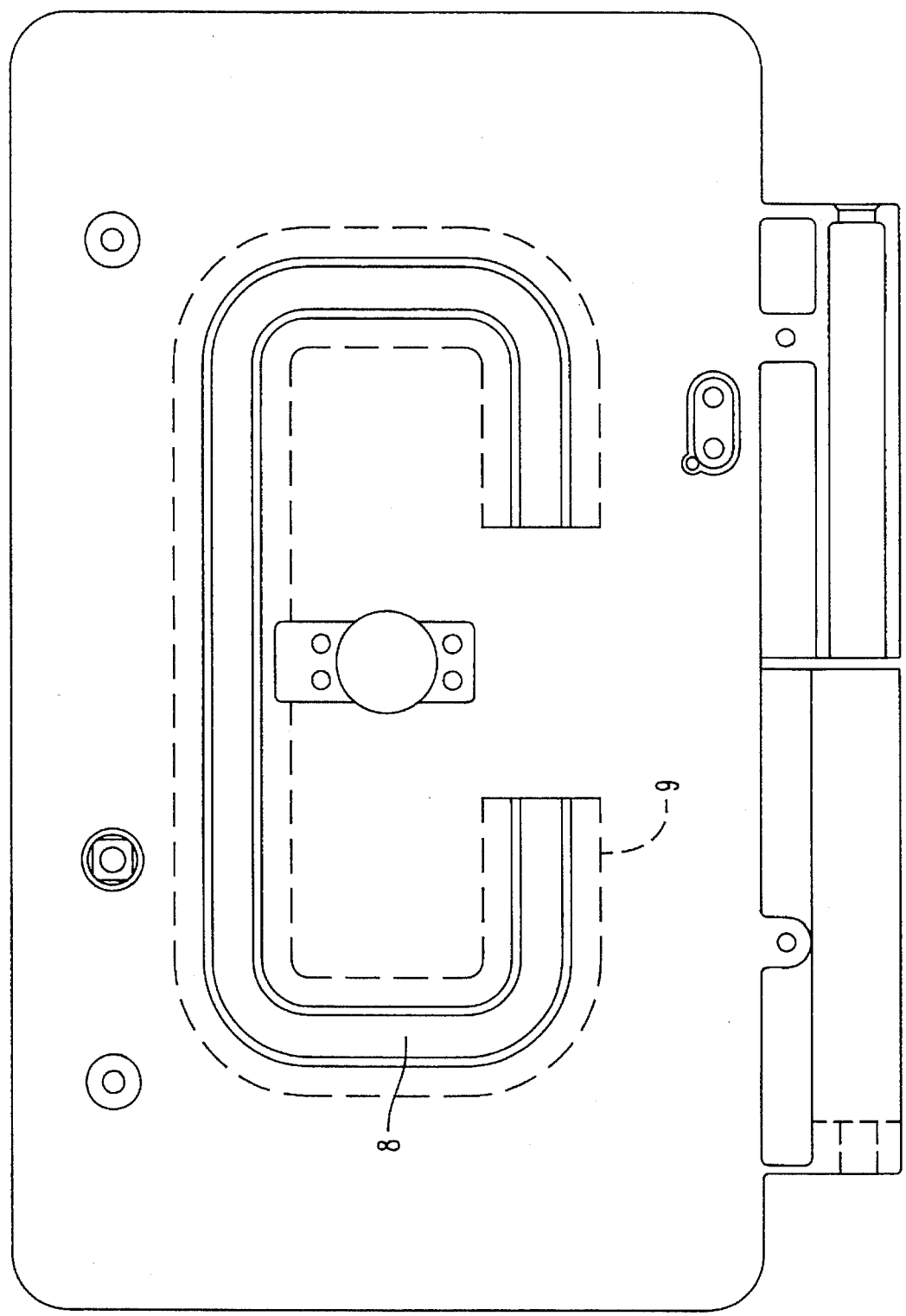
FIG. 4 is a plan view of the opposite surface of the body portion shown in FIG. 3.

Considering briefly FIG. 4 this shows the surface of one of the upper and lower body portions opposite from that bearing the hamburger moulds. It will be seen from FIG. 4, and also from FIGS. 1 and 2, that a single electric heating element 8 is attached to this rear surface by being positioned in a locating channel 9. The purpose of this heating element is, naturally, to heat the moulds to a sufficient temperature to cook the hamburger. Preferably both body portions are provided with heating elements to ensure that the hamburger is thoroughly cooked. The heating element is connected to power supply circuitry (not shown), and also to a thermostatic control (not shown) to prevent overheating.

Figure 5:
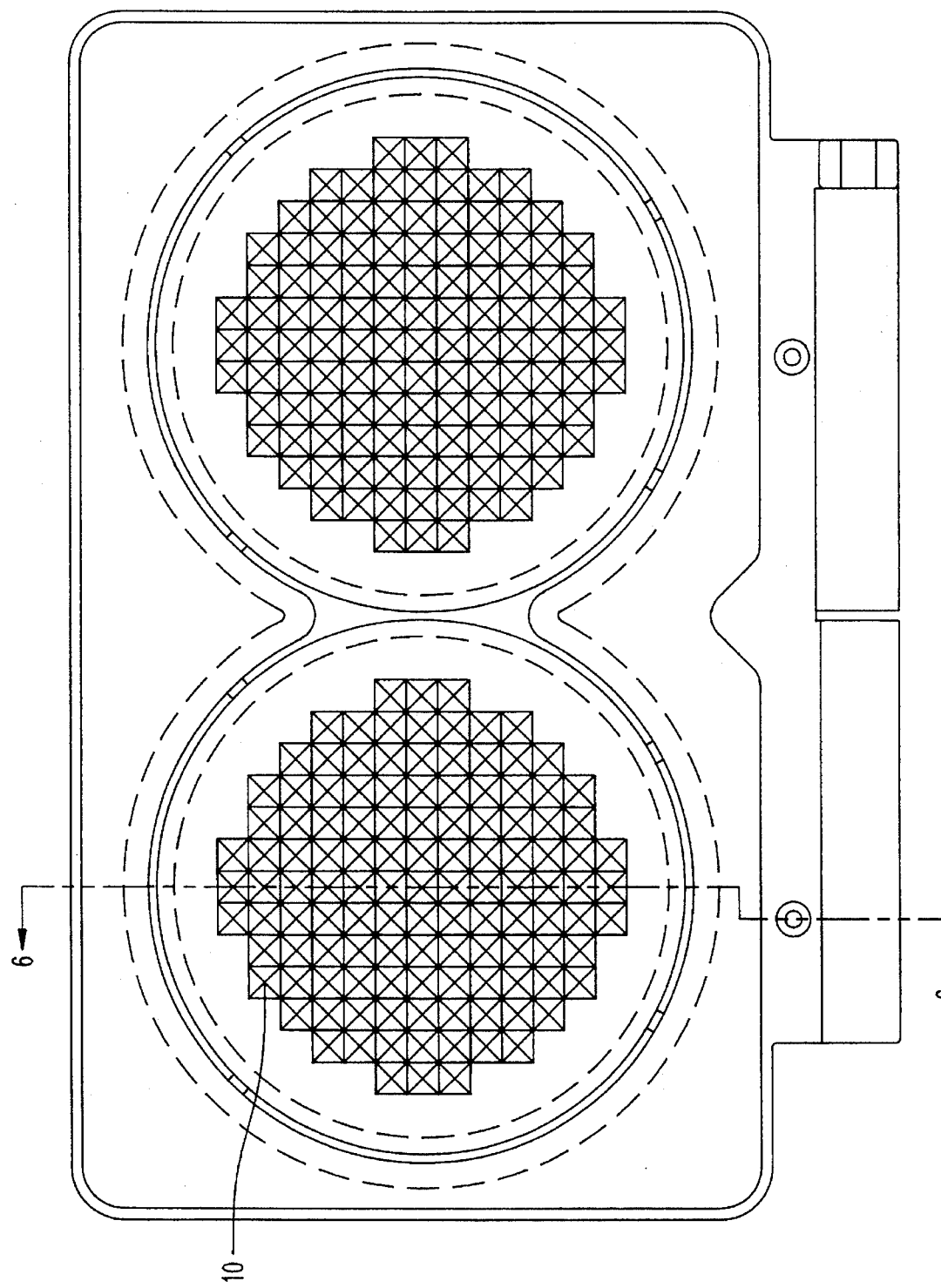
FIG. 5 is a plan view similar to FIG. 3 but showing an alternate cooking surface, and, FIG. 6 is a sectional view along line 6—6 of FIG. 5.
Figure 6:
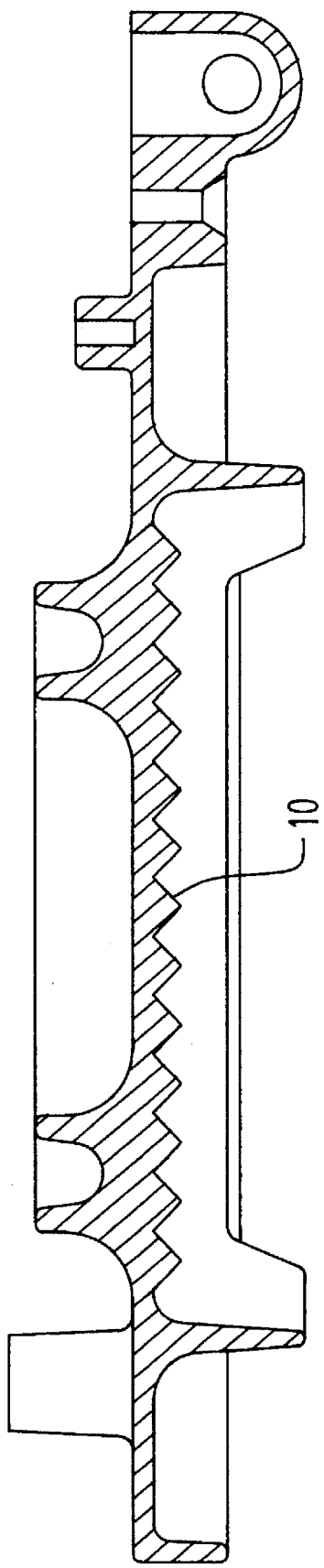

FIGS. 5 and 6 show an alternative form for the surface of at least one of the moulds. In this alternative embodiment the ribs 7 are repalced by a plurality of projections 10 arranged in a regular array. Each projection may be in the form of a cone or spike, or as shown in the embodiment of FIG. 5 may be in the form of small pyramids. In the embodiment of FIGS. 5 and 6 a total of 121 such pyramidal projections 10 are provided on one surface.

As with the ribs 7, these pyramidal projections have a dual function. Again as with the ribs of FIGS. 1 to 4 they serve to provide the finished food product with an attractive textured appearance. In addition, however, they project into the meat received within the mould and thus can also serve to tenderise the meat to be cooked. This is of less significance with respect to hamburger meat, but permits the cooking apparatus to be used in addition to cook other meats and meat products, for example steak.

I claim:

1. Apparatus for cooking a food product comprising a mold assembly for receiving the food product, said mold assembly comprising co-operating first and second molds, wherein each of said molds each mold having an associated heating element is provided with two radially opposed arcuate side wall portions, the side wall portions in one of said molds being disposed at substantially 90° relative to the side wall portions formed in the other of said molds, whereby when said first and second molds are brought together to define said mold assembly, said partial side wall portions define a substantially continuous side wall.

2. Apparatus as claimed in claim 1 wherein said first and second molds are provided respectively on upper and lower bodies, said upper and lower bodies being hingedly mounted to permit said first and second molds to be brought together and moved apart as required.

3. Apparatus as claimed in claim 1 wherein the surface of at least one of said molds defined within said wall portion is textured.

4. Apparatus as claimed in claim 3 wherein said at least one surface comprises a series of parallel ribs.

5. Apparatus as claimed in claim 4 wherein the surfaces of both of said molds are provided with said parallel ribs, the ribs on one of said surfaces being perpendicular to the ribs on the other of said surfaces.

6. Apparatus as claimed in claim 3 wherein said at least one surface is provided with a series of projections.

7. Apparatus as claimed in claim 6 wherein said projections are pyramidal in shape.

8. Apparatus as claimed in claim 1 wherein said food product is a hamburger.

* * * * *